United States Patent [19]

Mignani et al.

[11] Patent Number: 4,985,528
[45] Date of Patent: Jan. 15, 1991

[54] NOVEL NONLINEARLY OPTICALLY ACTIVE POLYURETHANES

[75] Inventors: Gerard Mignani; Pascal Barthelemy; Remi Meyrueix, all of Lyon, France

[73] Assignee: Rhone-Poulenc Chimie, Courbevoie, France

[21] Appl. No.: 408,383

[22] Filed: Sep. 18, 1989

[30] Foreign Application Priority Data

Sep. 16, 1988 [FR] France .................. 88 120

[51] Int. Cl.$^5$ .............................. C08G 18/67
[52] U.S. Cl. .......................... 528/59; 528/75; 528/85
[58] Field of Search .............. 528/59, 75, 85

[56] References Cited
U.S. PATENT DOCUMENTS 4,454,309 6/1984 Gould et al. ............ 528/75

Primary Examiner—Maurice J. Welsh
Attorney, Agent, or Firm—Burns, Doane, Swecker & Mathis

[57] ABSTRACT

Novel nonlinearly optically active polyurethane polymers, well suited for electrooptical applications, have recurring structural units of the formula:

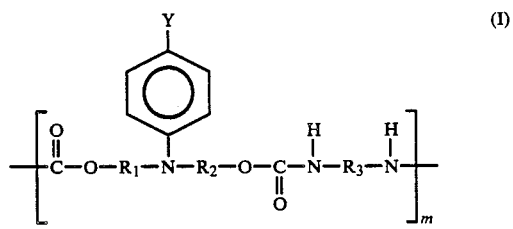

in which m is a number greater than 5; $R_1$ and $R_2$, which may be identical or different, are each a saturated or unsaturated alkyl or aromatic radical; $R_3$ is a linear aliphatic, or cyclic aromatic or arylaliphatic hydrocarbon radical; and Y is a group including a radical containing dislocated $\pi$ electrons and an electron acceptor group (A).

15 Claims, No Drawings

NOVEL NONLINEARLY OPTICALLY ACTIVE POLYURETHANES

CROSS-REFERENCE TO COMPANION APPLICATION

Our copending application Ser. No. 408,382, filed concurrently herewith and assigned to the assignee hereof.

BACKGROUND OF THE INVENTION

1. Field of the Invention

The present invention relates to novel polyurethane polymers useful in the production of materials having nonlinear optical activity.

Materials displaying nonlinear optical activity may have a strong cubic ($\chi^3$) or quadratic ($\chi^2$) susceptibility. This invention more especially relates to polymers or materials having a high quadratic susceptibility after polarization, and which also have a good cubic susceptibility.

2. Description of the Prior Art

Numerous polymers are known to this art that possess the property of being nonlinearly optically active. In certain cases, this activity is greater than that of the inorganic materials currently used for such purpose.

Polymers used in NLO (nonlinear optics) generally contain conjugate groups with dislocated electrons, which provide them with a significant cubic $\chi^{(3)}$ susceptibility value.

Furthermore, in certain polymers (including those of the present invention), the groups responsible for the NLO activity are not centrosymmetrical and have a strong hyperpolarizability $\beta$ of the second order.

These noncentrosymmetrical groups are most typically conjugated groups with transfer of charges, the orientation of which within the materials by a polarizing electrical field renders the material noncentrosymmetrical. The material then has a nonzero quadratic susceptibility $\chi^{(2)}$.

Heretofore, these polymers were polymers with conventional backbones, such as the polyolefins, polyacrylates, polymethacrylates, polychloroacrylates or polysiloxanes, for example, onto which polar charge transfer groups were grafted.

Compare, for example, EP-No. 262,680 and FR-No. 597,109. However, these polymers have certain disadvantages and, in particular, difficulties are encountered in the preservation of their nonlinear optical activity. Indeed, the graft segments must have a certain mobility to enable their orientation in an electrical field. But they always retain a certain residual mobility, whereby over the course of time they may lose their orientation. This results in a decrease in their electronic centrosymmetry generated by the electrical field and, consequently, in their nonlinear optical activity. This phenomenon is illustrated in the article by C. Ye et al, "M.R.S. Symposium Proc.", Vol. 109 (*Nonlinear Opt. Proc. of polymers*, p 263) J. Heeger Editor, 1988.

Another disadvantage of these polymers resides in the fact that the number of polar groups with charge transfer is generally low, as it is a function of the structure of the polymer. Furthermore, the number of grafts cannot be very high without introducing a significant change in the properatives of the polymer.

Materials are also known to the art which possess nonlinear optical activities and typically are constituted by a polymer matrix, into which is dissolved a compound having a nonlinear optical activity of the conjugate/charge transfer molecule type.

However, these compounds generally have low solubilities in the matrix and also possess a residual mobility in such matrix, which in time will effect a disorientation of said compounds, which renders the material centrosymmetric relative to electrical charges.

In fact, the quadratic nonlinear optical activity is generated by the dislocation of the electrons and a substantial noncentrosymmetry of the charges at the molecular and material level.

SUMMARY OF THE INVENTION

Accordingly, a major object of the present invention is the provision of a novel class of polyurethane polymers having good nonlinear optical activity, in particular a good quadratic activity, comprising polar charge transfer groups as a moiety in the recurring structural units of the polymer and constituting a link or bridge in the principal polymer chain. This suppresses their residual mobility, enabling production of a material that will retain its nonlinear optical activity over the course of time, and which otherwise ameliorates those disadvantages and drawbacks to date characterizing the state of this art.

Briefly, the present invention features novel polyurethane polymers at least in part comprising recurring structural units having the formula (I):

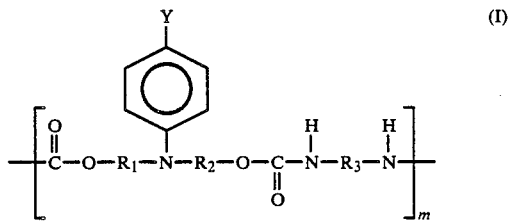

wherein m is a number greater than 5, preferably greater than 10 and advantageously ranging from 10 to 4,000; $R_1$ and $R_2$, which may be identical or different, are each a saturated or unsaturated alkyl or aromatic radical; $R_3$ is a linear aliphatic, or cyclic aromatic or arylaliphatic hydrocarbon radical; and Y is a group containing a radical having dislocated electrons and an electron acceptor group (A).

DETAILED DESCRIPTION OF THE PREFERRED EMBODIMENTS OF THE INVENTION

More particularly according to the present invention, the Y groups containing the radicals having dislocated electrons are integral moieties of the recurring structural units of the polymer and, thus, occupy a fixed position relative to the principal chain of the polymer. Consequently, following the creation of a noncentrosymmetry of the charges under the influence of an electrical field, the mobility of the charge transfer groups becomes very low and even zero, thereby enabling the retention of the nonlinear optical activity of the material during the aging thereof.

In another embodiment of the invention, in order to further reduce the mobility of the polar charge transfer groups, the polymer is crosslinked, either simultaneously with or after orientation by an electrical field, utilizing polyfunctional comonomers, such as, for example, triisocyanates, triols, triallyl compounds, added to the polymerization recipe. However, this crosslinking is not absolutely necessary.

In yet another embodiment of the invention, the polyurethanes are amorphous.

In a preferred embodiment of the invention, the recurring structural unit of formula (I) is one of the following radicals:

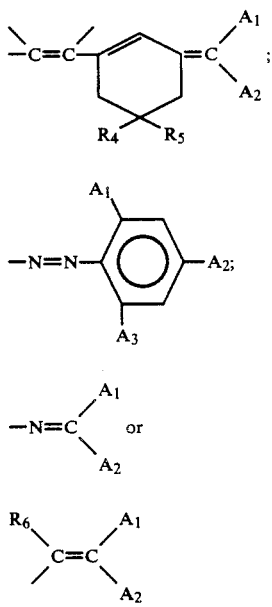

wherein $A_1$, $A_2$ and $A_3$, which may be identical or different, are each a hydrogen atom or an electron accepting radical, with the proviso they cannot simultaneously be hydrogen (the $A_1$, $A_2$ and $A_3$ electron acceptor radicals of the invention are preferably nitro, cyano, $-CO_2 R_5$, or $-PO_3 (R_5)_2$ radicals, in which $R_5$ is a lower alkyl radical, preferably an ethyl or propyl radical); $R_4$ and $R_5$ are aliphatic hydrocarbyl radicals containing from 1 to 4 carbon atoms; and $R_6$ is a hydrogen atom, a lower alkyl radical or an electron acceptor radical (A).

The preferred electron acceptor radicals ($A_1$, $A_2$, $A_3$) of the invention are cyano and nitro radicals and more preferably cyano/cyano and cyano/nitro combinations.

In another embodiment of the invention, the $R_1$ and $R_2$ radicals are methylidene chains, substituted or unsubstituted, containing 1 to 6 carbon atoms.

Advantageously, the polyurethane of the invention has a glass transition temperature (Tg) higher than 30° C. and preferably ranging from 40° to 250° C.

The present invention also features a process for the preparation of the above novel polyurethanes, comprising reacting a diisocyanate of formula (II):

$$ONC-R_3-CNO \qquad (II)$$

wherein $R_3$ is a linear, aliphatic or cyclic aromatic or arylaliphatic radical, with a compound of formula (III):

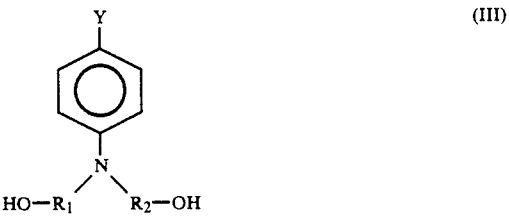

wherein $R_1$, $R_2$ and Y are as above defined.

Advantageously, to enable the crosslinking of the polyurethane, a polyfunctional compound, such as a triisocyanate, a polyol, or a polyallyl compound, is added to the difunctional compounds of formulae (II) and (III).

Suitable such diisocyanates include the following:
1,3-Diisocyanato propane;
1,4-Diisocyanato butane;
1,5-Diisocyanato pentane;
1,6-Diisocyanato hexane;
1,4-Diisocyanato 2-ethylbutane;
1,5-Diisocyanato 2-methylpentane;
1,6-Diisocyanato 2,2,4-trimethylhexane;
1,6-Diisocyanato 2,4,4-trimethylhexane;
1,2-Diisocyanato cyclohexane;
1,4-Diisocyanato cyclohexane;
1,2-bis(isocyanatomethyl)cyclobutane;
Bis(4-isocyanatocyclohexyl)methane;
3,3,5-Trimethyl-5-isocyanatomethyl 1-isocyanato cyclohexane;
1,4-Bis(isocyanatomethyl)benzene;
1,2-Bis(isocyanatomethyl)benzene;
Diisocyanato diphenyl methane;
Diisocyanato diphenyl propane;
Diisocyanato diphenyl ether;
Diisocyanato naphthalene.

These diisocyanates may be used either alone or in the form of mixtures thereof.

Exemplary of the polyfunctional crosslinking agents are triphenylmethane triisocyanate, the trimer of hexamethylene diisocyanate, the triol N, N′, N″-tris(hydroxyalkyl)hexahydrotriazine, or the following triallyl compound, N, N′, N″-tris(allyl)hexahydrotriazine, as well as the polyols of polyerythritol type, such as pentaerythritol.

It is also possible according to the invention to use a mixture of diols, at least one of which is a compound of formula (III). It is therefore possible to control the concentration of the compound of formula (III) and thus the number of polar charge transfer groups in the polymer.

However, in order to obtain an improved nonlinear optical activity, a preferred embodiment of the invention entails using only one diol of formula (III) or a mixture of diols of formula (III).

The present invention also features a material having nonlinear optical activity, containing as the active component a novel polyurethane as described above.

This material is produced, for example, by heating the polyurethane to a temperature at least equal to its glass transition temperature (Tg). The polyurethane heated in this manner is exposed to an electrical field to create a non-centrosymmetry of charges in the material.

The polymer thus oriented or "activated" in this fashion is then cooled and included as a component in an optically active device, such as means for electrooptical and optical treatment, such as transducers, modulators, parametric amplifiers, and the like.

In a second embodiment of the process for the preparation of the material of the invention, in the case in which the polyurethane is crosslinked, initially a partial polymerization of the mixture of difunctional and polyfunctional compounds is carried out. The prepolymer obtained in this manner is heated to a temperature higher than its softening temperature or glass transition temperature (Tg) to provide an appropriate mobility of the groups enabling the orientation of the polar charge transfer groups by the application of an electrical field. Finally, complete polymerization is carried out by any known means.

It is thus possible to orient the polar groups at a temperature sufficiently low to prevent any degradation of the polyurethane followed by final crosslinking, to produce a material having a high glass transition temperature, thereby further reducing the residual mobility of the polar groups in the material.

The material may be provided in any form, such as films, fibers, molded or extruded shaped articles, etc. It may also be used to form a coating, in particular by the so-called "spin-coating" method. The forming may be carried out by any known process for the shaping of a polymerizable or polymerized material, such as, for example, forming by melting, softening, dissolution and evaporation of the solvent.

Finally, different additives may be added to the polyurethane of the invention, for example, to facilitate its forming. It may also be used in admixture with another nonlinearly optically active or inactive polymer.

Specifications and explanations are given in more detail below concerning the activity of the materials in nonlinear optics and the determination of such activity.

The activity of materials in nonlinear optics is determined by measuring the susceptibility of the second, third or nth order.

The susceptibilities of a material are directly related to the polarization of the material by the following fundamental relationship:

$$P = P_o + \chi^1 \cdot E + \chi^2 E,E + \chi^3 E,E,E +$$

wherein P and Po represent polarization respectively in the presence and absence of an electromagnetic field.

E is the electrical of excitation.

$\chi^1$, $\chi^2$, $\chi^3$ represent the linear and nonlinear susceptibilities of the material.

In effect, the coefficient $\chi^1$ represents its linear optical activity.

These susceptibilities reflect an aharmonicity of the electronic potential in the material.

Furthermore, the odd order susceptibilities, such as $\chi^7$ are never zero for any of the materials. In contrast, the even order susceptibilities, such as the quadratic order susceptibility $\chi^2$, are zero for centrosymmetrical materials.

It is advantageous to use materials with a nonlinear, nonzero polarization for nonlinear optical applications, such as, for example, electrooptical devices, electrooptical modulators, guides or nonguides, or for purely optical applications, such as parametric amplifiers, frequency doubling devices, etc.

To determine and measure the susceptibility coefficient $\chi^2$ of the materials, it is detected by comparison with a reference material, for example quartz, or potassium dihydrogenophosphate (KDP).

The measurement of susceptibilities is generally carried out at frequencies (−2w, w, w) in a harmonic doubling experiment as described in the article by S. K. Kurtz, published in *Quantum Electronics*, edited by H. Rabin and C. L. Tang, Academic Press (1975), Vol. 1, pages 209–281.

It is also possible to measure $\chi^2$ at frequencies (−w; w, o) in an electrooptical experiment. For this, the film is placed on a sheet of glass covered with a transparent conductive oxide ($SnO_2$). The external face of the film is covered with a semi-transparent layer of gold, with the oxide and the gold serving as the electrodes, whereby the film is polarized to render it noncentrosymmetrical. After cooling, the assembly is placed in one of the arms of a MACH ZENDER interferometer and scanned at normal incidence by a laser beam having a wavelength of 633 nm.

The film is then exposed to an alternating current of 1 KHz and 10V.

The quadratic susceptibility $\chi^2{}_{113}$ (−w; w, o) is derived from the delay of the phase $\Delta\Phi$ caused by the voltage applied to the film, according to the following relationship:

$$\Delta\phi = \frac{2\pi}{\lambda} \cdot L \cdot \frac{\chi^2_{113}}{n} \cdot \frac{V}{L} = \frac{2\pi \chi^2_{113} V}{\lambda \cdot n}$$

wherein:

$\lambda$ is the wavelength of the laser;

n is the index of refraction of the film;

V is the electric voltage of the filed applied to the film;

L is the thickness of the film.

The second capability of susceptibility $\chi^2{}_{333}$ is given by the relationship:

$$\chi_{333}{}^2 = 3 \cdot \chi^2{}_{113}$$

This relationship is described in more detail in the article by K. D. Singer, published in *J. Opt. Soc. Am.*, B, Vol. 4, No. 6, pp. 968 et seq (1987).

The susceptibilities $\chi^2{}_{113}$ and $\chi^2{}_{333}$ are related to the electrooptical coefficient $r_{ijk}$ by the following relationships:

$$r_{113} = \frac{-2\chi^2{}_{113}}{n^4} \text{ and } r_{333} = \frac{-2\chi^2{}_{333}}{n^4}$$

wherein n is the index of refraction of the material.

In order to further illustrate the present invention and the advantages thereof, the following specific examples are given, it being understood that same are intended only as illustrative and in nowise limitative.

EXAMPLE 1

Preparation of the polymer (A) comprising the recurring structural units:

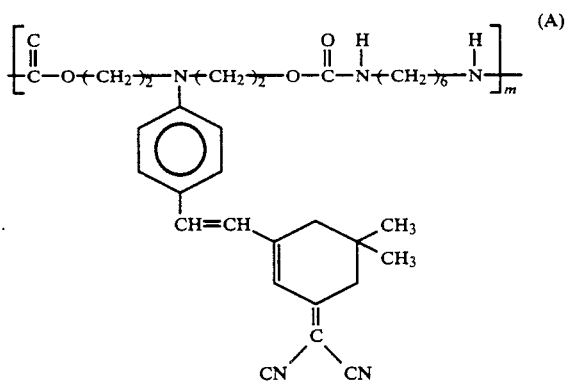

This polymer was prepared by reacting a diisocyanate, hexamethylene diisocyanate, with a compound of the following formula:

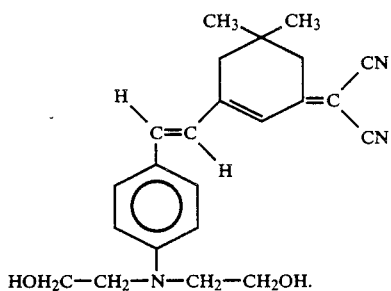

This compound was itself prepared by reacting a compound of the formula:

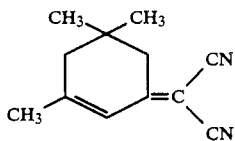

with the compound of the formula:

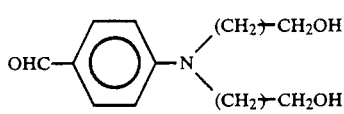

in an ethanol medium and in the presence of piperidine as the catalyst.

The product was recovered by evaporating the solvent and separating it on a silica gel column (eluant: ethyl acetate) in the form of a red-violet solid having a melting point of 168° C.

This preparative process and the operating conditions of the reaction are described, in particular, in DE-No. 2,345,189, the article by Ralf Lemke, "Knoevenagel - Kondensationen in Dimethylformamid" (Knoevenagel condensation in dimethylformamide) published in *Synthesis*, 5, 359 (1974), and in the article "Solvatochromie von 80 μm in verschiedmen Alkohole bei Arylidenisophorm-Abkömmlignen" by the same author, in *Chem. Ber.*, 103, 1894 (1970).

This compound was dissolved in an anhydrous solvent (1a 1,3-dimethylimidazolidinone). The solution was then introduced into a solution of hexamethylene diisocyanate in the same solvent as above, also containing a polycondensation catalyst, such as dibutyl-tin dilaurate. This technique for the preparation of polymer A is conventional and is currently used for the preparation of polyurethane polymers. The reaction temperature was on the order of 105° C.

After precipitation by pouring the reaction medium into water, a red-wine dreg colored precipitate was obtained, which was recovered by filtration.

The molecular weight of the polymer recovered, determined by gel exclusion chromatography in N-methyl pyrrolidone (NMP) was 54,300 g (m was equal to about 30).

Differential thermal analysis evidenced that there was no endothermic transition corresponding to melting. The glass transition temperature, Tg, was 45° C., determined by the fiber pendulum method.

The polymer obtained was soluble in acetone, chlorinated solvents, dimethylformamide, dimethylsulfoxide, N-methylpyrrolidone, but insoluble in water and alcohols.

UV spectrometric and NMR analyses confirmed the structure of the polymer indicated above and showed that the maximum adsorption wavelength in UV in N-methylpyrrolidone medium was 520 nm.

The polymer, after being shaped into a 3.37 μm thick film by the spin-coating method from a 10% solution in cyclohexanone, was exposed to a polarizing electrical field of 50 v/μm after heating to 100° C. for several seconds, then cooled to ambient temperature.

The determination of its electrooptical activity at a wavelength of 633 nm showed that it had a quadratic susceptibility:

$$\chi^2{}_{333}(-w; w, o) \text{ equal to } 130 \times 10^{-12} \text{ m.V}^{-1}$$

EXAMPLE 2

Preparation of the polymer (B) comprising the recurring structural units:

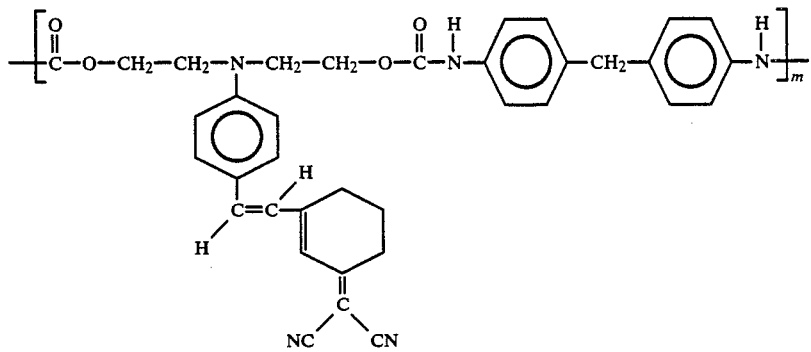

This polymer was prepared in a manner similar to Example 1, by replacing the hexamethylene diisocyanate with diphenylmethanediisocyanate.

The product obtained, which showed no endothermic transformation in differential thermal analysis, had a glass transition temperature (Tg) of 90° C., a molecular weight of 21,000 (m was equal to about 18) and maximum adsorption wavelength of 505 nm. Characteristics were determined by the techniques described in Example 1.

Its nonlinear optical characteristics and in particular its second order susceptibility $\chi^2_{333}$ were determined by the methods described in Example 1. However, the orientation of the groups was carried out at a temperature of 120° C. for several minutes.

The determination of its electrooptical activity at a laser wavelength of 633 nm showed that $\chi^2_{333}$ (−w; w, o) was equal to $95 \times 10^{-12}$ mV$^{-1}$.

EXAMPLE 3

Preparation of a crosslinked polymer

To prepare this polymer:

1. A prepolymer was synthesized as described in Example 1, by using an excess of diol relative to the diisocyanate. This excess amounted to 4 mole %.

The prepolymer obtained in this manner was principally chain-terminated by hydroxyl groups.

It had a glass transition temperature of 49° C.

2. The prepolymer was dissolved in cyclohexanone in a concentration of 15%. The catalyst (dibutyl tin dilaurate) and a slight excess, relative to the hydroxyl groups, of HDI trimer of the following formula, were added:

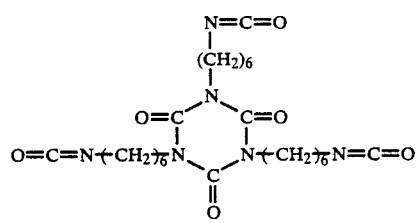

The prepolymer was applied in the form of 3.2 μm thick film to the heated support from a 10% solution in cyclohexane, then exposed to a polarizing field of 50V/μm at a temperature of 50° C. for 10 min. The temperature was then increased to 120° C. to effect complete crosslinking, then cooled to ambient temperature.

In this manner, a material having a glass transition temperature of 80° C. and an electrooptical susceptibility $\chi^2$ (−w, w, o) of $80 \times 10^{-12}$ mV$^{-1}$ at 633 nm was obtained.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A polyurethane polymer comprising recurring structural units of the formula:

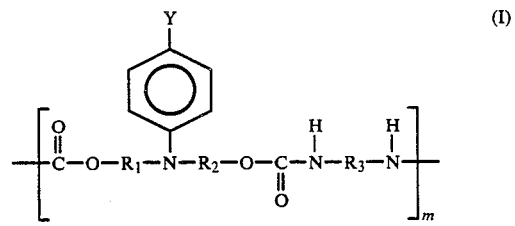

in which m is a number greater than 5; $R_1$ and $R_2$, which may be identical or different, are each a saturated or unsaturated alkyl or aromatic radical; $R_3$ is a linear aliphatic, or cyclic aromatic or arylaliphatic hydrocarbon radical; and Y is a group which comprises a radical containing dislocated π electrons and an electron acceptor group (A).

2. The polyurethane polymer as defined by claim 1, in amorphous state.

3. The polyurethane polymer as defined by claim 1, wherein m is at least 10.

4. The polyurethane polymer as defined by claim 3, wherein m ranges from 10 to 4,000.

5. The polyurethane polymer as defined by claim 1, wherein Y is one of the following radicals:

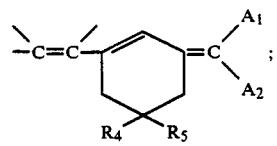

-continued

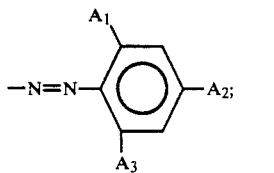

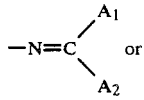

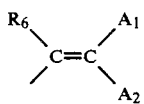

in which $A_1$, $A_2$ and $A_3$, which may be identical or different, are each a hydrogen atom or an electron acceptor group, with the proviso that they cannot simultaneously be hydrogen atoms; $R_4$ and $R_5$ are each aliphatic radicals containing from 1 to 4 carbon atoms; and $R_6$ is a hydrogen atom, a lower alkyl radical, or an electron acceptor group (A).

6. The polyurethane polymer as defined by claim 1, wherein Y is a cyano or nitro radical.

7. The polyurethane polymer as defined by claim 1, wherein $R_1$ and $R_2$ are methylidene radicals containing from 1 to 6 carbon atoms.

8. The polyurethane polymer as defined by claim 1, in crosslinked state.

9. The polyurethane polymer as defined by claim 1, having a glass transition temperature high than 30° C.

10. The polyurethane polymer as defined by claim 9, having a glass transition temperature ranging from 40° to 250° C.

11. A process for the preparation of the polyurethane polymer as defined by claim 1, comprising reacting a diisocyanate of the formula:

$$OCN-R_3-NCO \quad (II)$$

with a compound of the formula:

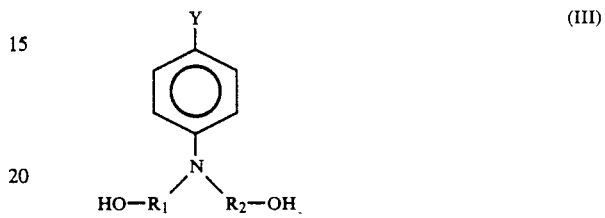

12. The process as defined by claim 11, comprising copolymerizing a polyfunctional compound with said difunctional compounds (II) and (III).

13. A nonlinearly optically active material comprising a polyurethane polymer as defined by claim 1.

14. The nonlinearly optically active material as defined by claim 13, comprising a fiber, film or molded shaped article.

15. The nonlinearly optically active material as defined by claim 13, comprising an optoelectrical device.

* * * * *